US010275353B2

(12) United States Patent
Li et al.

(10) Patent No.: US 10,275,353 B2
(45) Date of Patent: Apr. 30, 2019

(54) DATA WRITE CONTROL APPARATUS AND METHOD

(71) Applicant: Huawei Technologies Co., Ltd., Shenzhen (CN)

(72) Inventors: Hehe Li, Beijing (CN); Yongpan Liu, Beijing (CN); Qinghang Zhao, Beijing (CN); Rong Luo, Beijing (CN); Huazhong Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/696,416

(22) Filed: Sep. 6, 2017

(65) Prior Publication Data
US 2017/0364441 A1 Dec. 21, 2017

Related U.S. Application Data

(63) Continuation of application No. PCT/CN2016/074045, filed on Feb. 18, 2016.

(30) Foreign Application Priority Data

Mar. 6, 2015 (CN) .......................... 2015 1 0101154

(51) Int. Cl.
G06F 3/06 (2006.01)
G06F 12/0815 (2016.01)
(Continued)

(52) U.S. Cl.
CPC .......... G06F 12/0815 (2013.01); G06F 3/061 (2013.01); G06F 3/068 (2013.01);
(Continued)

(58) Field of Classification Search
CPC .. G06F 12/0804; G06F 12/0815; G06F 3/061; G06F 3/0653; G06F 3/068; G06F 11/1446; G06F 12/0862
(Continued)

(56) References Cited

U.S. PATENT DOCUMENTS 8,464,002 B2 6/2013 Burger et al.
2005/0195635 A1 9/2005 Conley et al.
(Continued)

FOREIGN PATENT DOCUMENTS

CN 1617110 A 5/2005
CN 1950804 A 4/2007
(Continued)

OTHER PUBLICATIONS

Foreign Communication From A Counterpart Application, European Application No. 16761027.8, Extended European Search Report dated Feb. 6, 2018, 8 pages.
(Continued)

Primary Examiner — Hua J Song
(74) Attorney, Agent, or Firm — Conley Rose, P.C.

(57) ABSTRACT

A data write control method includes detecting a quantity of dirty blocks in a first memory when a write control apparatus is in write-back mode; separately predicting execution progress of a program run by a processor within a danger time period in the two write modes when the quantity of dirty blocks reaches a first preset threshold; when it is predicted that the execution progress of the program run by the processor within the danger time period in write-through mode is faster than the execution progress of the program run by the processor within the danger time period in write-back mode, switching a current data write mode to the write-through mode; and detecting the quantity of dirty blocks when the write control apparatus is in write-through (Continued)

mode and switching the current data write mode to the write-back mode when the quantity of dirty blocks decreases to a second preset threshold.

22 Claims, 3 Drawing Sheets

(51) Int. Cl.
*G06F 12/0862* (2016.01)
*G06F 12/0804* (2016.01)
*G06F 12/0897* (2016.01)
*G06F 11/14* (2006.01)

(52) U.S. Cl.
CPC ........ *G06F 3/0653* (2013.01); *G06F 11/1446* (2013.01); *G06F 12/0804* (2013.01); *G06F 12/0862* (2013.01); *G06F 12/0897* (2013.01); G06F 3/0623 (2013.01); G06F 3/0656 (2013.01); G06F 2212/222 (2013.01); G06F 2212/502 (2013.01); G06F 2212/60 (2013.01); G06F 2212/601 (2013.01); G06F 2212/621 (2013.01)

(58) Field of Classification Search
USPC .................................. 711/103, 143
See application file for complete search history.

(56) References Cited

U.S. PATENT DOCUMENTS

| 2011/0197036 | A1 | 8/2011 | Ishii |
| 2013/0086330 | A1 | 4/2013 | Baddepudi et al. |
| 2014/0006834 | A1* | 1/2014 | Ishii ........................ G06F 1/30 713/340 |
| 2014/0122809 | A1* | 5/2014 | Robertson ............ G06F 12/084 711/141 |
| 2014/0189252 | A1* | 7/2014 | Biswas ............... G06F 12/0884 711/142 |

FOREIGN PATENT DOCUMENTS

| CN | 103092774 A | 5/2013 |
| CN | 103917963 A | 7/2014 |
| WO | 2014143053 A1 | 9/2014 |

OTHER PUBLICATIONS

Machine Translation and Abstract of Chinese Publication No. CN1617110, dated May 18, 2005, 19 pages.
Machine Translation and Abstract of Chinese Publication No. CN103092774, dated May 8, 2013, 13 pages.
Foreign Communication From A Counterpart Application, PCT Application No. PCT/CN2016/074045, English Translation of International Search Report dated May 24, 2016, 2 pages.
Foreign Communication From A Counterpart Application, PCT Application No. PCT/CN2016/074045, English Translation of Written Opinion dated May 24, 2016, 6 pages.

* cited by examiner

DATA WRITE CONTROL APPARATUS AND METHOD

CROSS-REFERENCE TO RELATED APPLICATIONS

This application is a continuation of International Application No. PCT/CN2016/074045, filed on Feb. 18, 2016, which claims priority to Chinese Patent Application No. 201510101154.4, filed on Mar. 6, 2015, both of which are hereby incorporated by reference in their entireties.

TECHNICAL FIELD

The present application relates to the field of data write control technologies, and in particular, to a data write control apparatus and method.

BACKGROUND

A nonvolatile static random access memory (NV-SRAM) is a storage structure including both an static random access memory (SRAM) and a non-volatile memory (NVM). In a working mode, an electronic apparatus stores data using an SRAM. After the electronic apparatus encounters a power failure, an NV-SRAM can back up data to an NVM unit. However, after the electronic apparatus encounters a power failure, the nonvolatile SRAM needs to be powered by a relatively large on-chip energy storage capacitor, so as to perform data backup. The capacitor may cause relatively high overheads of a chip area and costs. If a relative small on-chip energy storage capacitor is used, backup may fail due to insufficient electric energy. After the backup fails, a previous successful backup point needs to be rolled back to. Rolling back to the previous backup point causes some performance overheads, thereby affecting execution progress of a program.

SUMMARY

Embodiments of the present application provide a data write control apparatus and method, so that the program execution efficiency of the write apparatus and method is improved by switching between two different write modes.

A first aspect of the embodiments of the present application provides a data write control apparatus, including a first memory, a second memory, and a processor, where the first memory includes a volatile storage unit, the second memory is a nonvolatile storage unit, and a data write mode of the data write control apparatus includes a write-back mode and a write-through mode; and in write-back mode, the processor writes received data to the first memory, and in write-through mode, the processor writes received data to the first memory and the second memory; when the write control apparatus is in write-back mode, the processor detects a quantity of dirty blocks in the first memory; when the quantity of dirty blocks reaches a first preset threshold, separately predicts execution progress of a program run by the processor within a danger time period in the two write modes; and when it is predicted that the execution progress of the program run by the processor within the danger time period in write-through mode is faster than the execution progress of the program run by the processor within the danger time period in write-back mode, switches a current data write mode to the write-through mode; and when the write control apparatus is in write-through mode, the processor detects the quantity of dirty blocks; and when the quantity of dirty blocks decreases to a second preset threshold, switches the current data write mode to the write-back mode.

Further, according to the first aspect of the embodiments of the present application, the first memory further includes a nonvolatile storage unit; after the data write control apparatus encounters a power failure, data in the volatile storage unit is backed up to the nonvolatile storage unit; and the first preset threshold is a maximum quantity of dirty blocks that can be backed up by the first memory.

Further, according to the first aspect of the embodiments of the present application, a calculation formula for predicting the execution progress of the program of the write control apparatus when the write-back mode is used is:

$$E(G-R) = k\left(L - \frac{1}{\lambda} - t_s\right) + ke^{-\lambda L}\left(L + \frac{1}{\lambda} - t_s\right)$$

where k is the execution progress of the program run by the processor within a unit time in write-back mode; L is a length of the preset danger time period; if a time when the quantity of dirty blocks reaches the first preset threshold is used as a zero time, $t_s$ is a time of latest power supply before the zero time; and $1/\lambda$ is an average power supply time of the data write control apparatus that is pre-obtained by means of statistics collection; and a calculation formula for predicting the execution progress of the program of the write control apparatus when the write-through mode is used is:

$$E(G')=k'L$$

where k' is the execution progress of the program run by the processor within a unit time in write-through mode.

Further, according to the first aspect of the embodiments of the present application, the second preset threshold equals the first preset threshold minus 1.

A second aspect of the embodiments of the present application provides a data write control method applied in the data write control apparatus, where the data write control apparatus includes a first memory, a second memory, and a processor, the first memory includes a volatile storage unit, the second memory is a nonvolatile storage unit, and a data write mode of the data write control apparatus includes a write-back mode and a write-through mode; and in write-back mode, the processor writes received data to the first memory, in write-through mode, the processor writes received data to the first memory and the second memory; and the method includes, when the write control apparatus is in write-back mode, detecting, by the processor, a quantity of dirty blocks in the first memory; when the quantity of dirty blocks reaches a first preset threshold, separately predicting execution progress of a program run by the processor within a danger time period in the two write modes; when it is predicted that the execution progress of the program run by the processor within the danger time period in write-through mode is faster than the execution progress of the program run by the processor within the danger time period in write-back mode, switching a current data write mode to the write-through mode; and when the write control apparatus is in write-through mode, detecting the quantity of dirty blocks; and when the quantity of dirty blocks decreases to a second preset threshold, switching the current data write mode to the write-back mode.

Further, according to the second aspect of the embodiments of the present application, the first memory further includes a nonvolatile storage unit; after the data write control apparatus encounters a power failure, data in the volatile storage unit is backed up to the nonvolatile storage unit; and the first preset threshold is a maximum quantity of dirty blocks that can be backed up by the first memory.

Further, according to the second aspect of the embodiments of the present application, a calculation formula for predicting the execution progress of the program of the write control apparatus when the write-back mode is used is:

$$E(G-R) = k\left(L - \frac{1}{\lambda} - t_s\right) + ke^{-\lambda L}\left(L + \frac{1}{\lambda} - t_s\right)$$

where k is the execution progress of the program run by the processor within a unit time in write-back mode; L is a length of the preset danger time period; if a time when the quantity of dirty blocks reaches the first preset threshold is used as a zero time, $t_s$ is a time when power is supplied to the data write control apparatus within the danger time period; and $1/\lambda$ is an average power supply time of the data write control apparatus that is pre-obtained by means of statistics collection; and a calculation formula for predicting the execution progress of the program of the write control apparatus when the write-through mode is used is:

$$E(G')=k'L$$

where k' is the execution progress of the program run by the processor within a unit time in write-through mode.

Further, according to the second aspect of the embodiments of the present application, the second preset threshold equals the first preset threshold minus 1.

As can be seen, according to the data write control apparatus and method in the embodiments of the present application, when a data write mode of the data write control apparatus is a write-back mode, a quantity of dirty blocks in a volatile storage unit is detected. When the quantity of dirty blocks reaches a preset threshold, it is determined according to a preset condition whether to switch the data write mode of the data write control apparatus to a write-through mode. When the preset condition is satisfied and the data write mode the data write control apparatus is switched to the write-through mode, the quantity of dirty blocks continues to be detected. When the quantity of dirty blocks is less than a second preset threshold, the data write mode of the data write control apparatus is switched to the write-back mode. In this way, execution performance of a program of the data write control apparatus can be improved.

BRIEF DESCRIPTION OF DRAWINGS

To describe the technical solutions in the embodiments of the present application more clearly, the following briefly describes the accompanying drawings required for describing the embodiments or the prior art. The accompanying drawings in the following description show merely some embodiments of the present application, and a person of ordinary skill in the art may still derive other drawings from these accompanying drawings without creative efforts.

DESCRIPTION OF EMBODIMENTS

Figure 1:
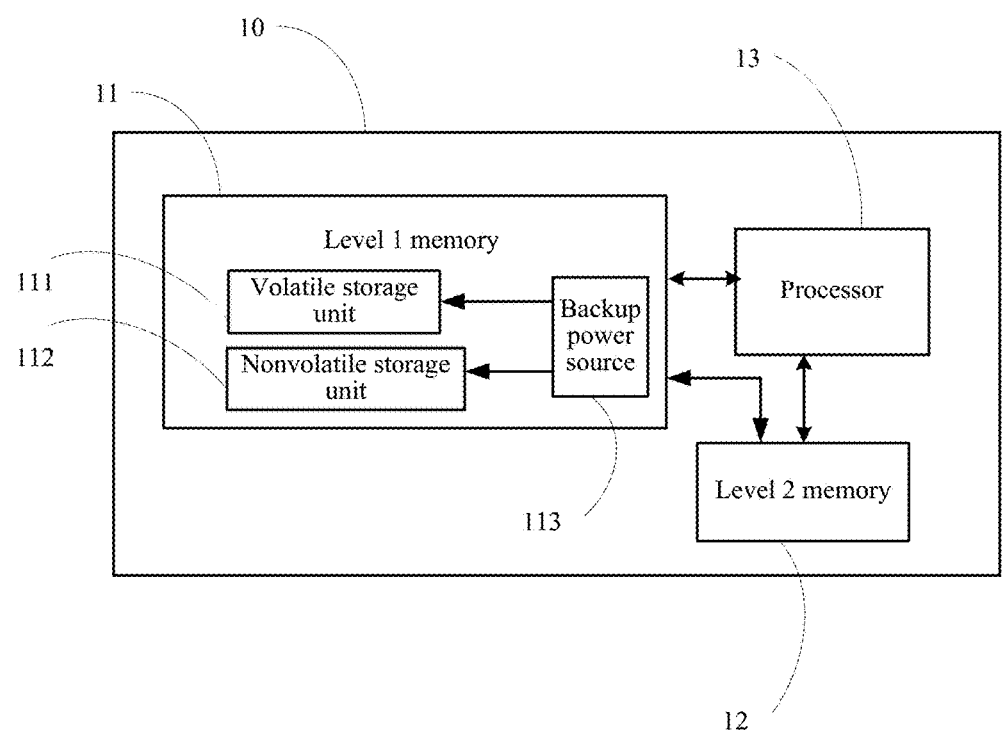
FIG. 1 is a structural diagram of a data write apparatus according to a first embodiment of the present application.

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

Technical solutions provided in the embodiments of the present application are mainly applied in a memory that has both a nonvolatile storage unit and a volatile storage unit, for example, a NV-SRAM. When an electronic apparatus using a memory of this structure as an internal memory encounters a power failure, power may be supplied to the memory using a backup power source on the memory, so that data in the volatile storage unit is backed up to the nonvolatile storage unit. For ease of description, the present application is described using the NV-SRAM as an example in the following embodiments. It should be noted that the memory applied in the present application is not limited to the NV-SRAM, and another memory having the same structure is also within the scope disclosed in the present application.

The volatile storage unit in NV-SRAM is a SRAM, the nonvolatile storage unit is a phase-change random access memory (PCM), and the backup power source is an on-chip energy storage capacitor.

The technical solutions provided in the present application are described from different perspectives using different embodiments below.

First Embodiment

The first embodiment provides a data write control apparatus 10. The data write control apparatus 10 includes a first memory 11, a second memory 12, and a processor 13. The first memory 11 includes a volatile storage unit 111 and a nonvolatile storage unit 112. The second memory 12 is a nonvolatile storage unit.

The write control apparatus 10 includes two data write modes, that is, a write-back mode and a write-through mode. In write-back mode, data in a received data write request is written to the first memory. In write-through ( ) mode, data in a received data write request is written to both the first memory 11 and the second memory 12.

In this embodiment, the first memory 11 is a NV-SRAM; the volatile storage unit 111 is a SRAM; and the nonvolatile storage unit 112 is a PCM. After the data write control apparatus 10 encounters a power failure, power may be supplied to the first memory 11 using a backup power source 113 on the first memory 11, so that data in the volatile storage unit 111 is backed up to the nonvolatile storage unit 112.

In write-back mode, when receiving a data write instruction, the processor 13 directly writes data to a storage block in the volatile storage unit 111. The data written to the volatile storage unit 111 is written to the second memory 12 only when the data needs to be replaced in the volatile storage unit 111. A storage block that is written to the volatile storage unit 111 but is not written to the second memory 12 is a dirty block. Each storage block has a dirty block tag, which is used to identify whether the storage block is a dirty block. The volatile storage unit 111 has relatively high data read and write speeds. Therefore, in write-back mode, the data write control apparatus 10 has faster program processing progress. When the data write control apparatus 10 encounters a power failure, data in all dirty blocks in the volatile storage unit 111 needs to be backed up to the nonvolatile storage unit 112. However, because electric energy of the backup power source 113 is limited, when a quantity of dirty blocks exceeds a quantity of dirty blocks whose backup is supported by the backup power source 113, the backup fails. When the backup fails, a program needs to be rolled back to a previous successful backup point. This causes high performance overheads, thereby affecting execution progress of the program.

In write-through mode, when receiving a data write instruction, the processor 13 also writes data to the second memory 12 when writing the data to the storage block of the volatile storage unit 111. In this way, no dirty block is generated. Therefore, no backup failure occurs. However, speeds of reading and writing data by the nonvolatile storage unit 112 are relatively low. Therefore, compared with the write-back mode, in write-through mode, the data write control apparatus 10 has relatively slow program processing progress.

Therefore, to improve performance of the data write control apparatus 10, the data write control apparatus 10 provided in this embodiment may be switched between the two data write modes, thereby improving the overall program processing progress.

When the write control apparatus 10 is in write-back mode, the processor 13 detects a quantity of dirty blocks in the first memory 11; when the quantity of dirty blocks reaches a first preset threshold, predicts execution progress of a program in the two write modes; and when it is predicted that the execution progress in write-through mode is faster than the execution progress in write-back mode, switches a current data write mode to the write-through mode.

When the write control apparatus 10 is in write-through mode, the processor 13 detects the quantity of dirty blocks; and when the quantity of dirty blocks reaches a second preset threshold, switches the current data write mode to the write-back mode.

The first preset threshold is a maximum quantity of dirty blocks that can be backed up by the first memory 11.

In this embodiment, in an implementation manner, when the quantity of dirty blocks detected by the processor 13 reaches the first preset threshold, the current data write mode is switched to the write-through mode.

In another implementation manner, when the quantity of dirty blocks detected by the processor 13 reaches the first preset threshold, the execution progress of the program in the two write modes is predicted. In this case, the predicted execution progress of the program is execution progress of the program within a danger time period L that is from a time when the quantity of dirty blocks reaches the first preset threshold to a time when the quantity of dirty blocks is less than the first preset threshold.

The data write control apparatus 10 in this embodiment is usually a particular detection apparatus, for example, a sensor used for detecting a health status of a human body in a wearable device. Therefore, only one particular program is usually run. The danger time period L in which a quantity of dirty blocks of the running program reaches and is greater than the first preset threshold is basically the same. Therefore, for the particular program, the danger time period L may be obtained in advance.

In this embodiment, execution progress of a program may be represented using a percentage. The data write control apparatus 10 runs the particular program. Therefore, a total quantity of instructions of the program is definite. The execution progress of the program may be calculated according to Formula (1):

$$G(t) = \frac{N_{executed}(t)}{N_{total}} \quad (1)$$

where $N_{executed}(t)$ is a quantity of instructions that have been executed, and $N_{total}$ is the total quantity of instructions; and if time overheads caused by pipeline stall are ignored, it may be approximately considered that G(t) linearly increases.

First, the progress of the program is calculated when the write-back mode is used within the danger time period L.

Figure 2:
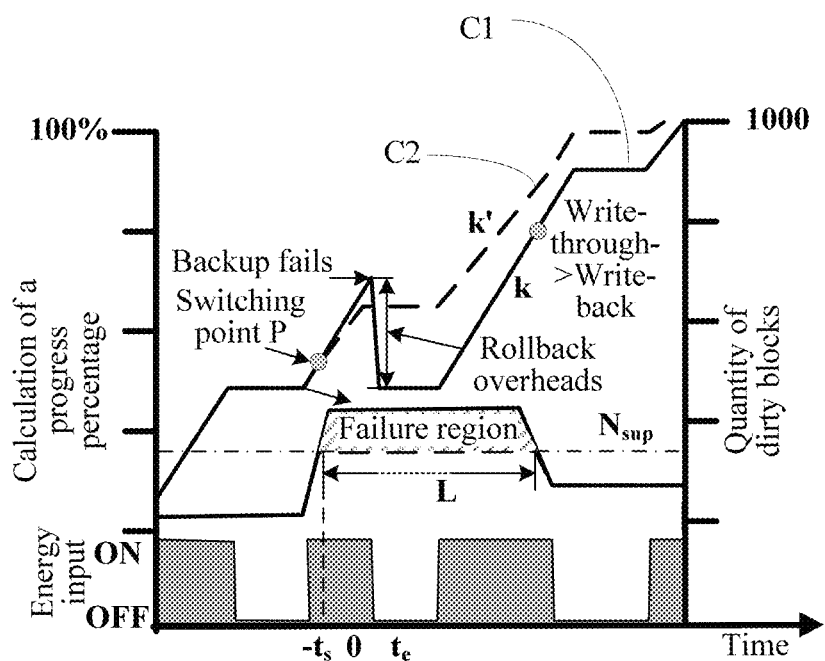
FIG. 2 is a schematic diagram of switching between two data write modes of the data write apparatus.

As shown in FIG. 2, a curve C1 is a progress curve of the program when the write-back mode is used, and a curve C2 is a progress curve of the program when the write-through mode is used.

After the program starts running, the data write control apparatus 10 writes data in write-back mode, starts detecting the quantity of dirty blocks; and when the quantity of dirty blocks reaches the first preset threshold, obtains the preset danger time period L, and predicts processing progress of the program in the two write modes in the time period L.

When the quantity of dirty blocks reaches the first preset threshold, and the write-back mode is not switched to the write-through mode, a process for calculating the processing progress of the executed program is as follows.

First, a power failure probability of the data write control apparatus 10 is calculated. In actual application, a power failure may occur in different situations. For example, if the data write control apparatus 10 uses a solar power system, a passive power failure occurs when sun is blocked, the sun angle changes, the weather changes, or the like. This feature is represented as memorylessness of a power supply time in terms of a power supply feature, that is, power supply time lengths are not directly associated with one another. Therefore, modeling may be performed on a power supply time by means of exponential distribution:

$$f(t_{on}) = \begin{cases} \lambda e^{-\lambda t_{on}} & \text{if } t_{on} \geq 0 \\ 0 & \text{if } t_{on} < 0 \end{cases} \quad (2)$$

where $f(t_{on})$ is a probability density of the power supply time length, and $$\frac{1}{\lambda}$$

is a mathematical expectation of the power supply time length.

Then, a formula for calculating a probability that a power failure occurs within the danger time period L is:

$$P(F) = P(t_{on} < L) = \int_0^L f(t_{on}) dt_{on} = 1 - e^{-\lambda L} \quad (3)$$

For a continuous power supply time t, formulas for calculating progress percentages when the two modes are used are respectively:

$$G(t) = kt$$

$$G'(t) = k't$$

where k is a program progress within a unit time when the write-back mode is used, and k' is a program progress within a unit time when the write-through mode is used.

If a power failure occurs within the danger time period L, a backup failure occurs, and after backup fails, backup rollback occurs. As shown in FIG. 2, if a power failure occurs at a time Te, a backup failure occurs, and the program needs to be rolled back to a program progress at a time Ts when this power supply starts. If a start point of the danger time period L, that is, a switching point P, is used as a zero time, progress of the rolled-back program is:

$$R(t_e) = \begin{cases} G(t_e + t_s) & \text{if } t_e < L \\ 0 & \text{if } t_e > L \end{cases} \quad (4)$$

where Te<L represents that a power failure occurs within the danger time period L; and Te>L represents that no power failure occurs within the danger time period L, and the program does not need to be rolled back.

Therefore, if the write-back mode is not switched to the write-through mode at the switching point within the danger time period L, a formula for calculating an expectation of an actual progress percentage G–R is:

$$E(G - R) = \qquad (6)$$
$$G(L) - \int_0^L k(t_e + t_s) f(t_e) dt_e = k\left(L - \frac{1}{\lambda} - t_s\right) + ke^{-\lambda L}\left(L + \frac{1}{\lambda} - t_s\right)$$

If the quantity of dirty blocks reaches the first preset threshold, the data write mode is switched to the write-through mode at the switching point, and a formula for calculating an expectation of the actual progress percentage G–R is:

$$E(G') = k'L \qquad (7)$$

The data write mode is switched to the write-through mode only when E(G–R)<E (G'), that is:

$$E(G - R) - E(G') = k\left(L - \frac{1}{\lambda^2} - \frac{t_s}{\lambda}\right) + \frac{ke^{-\lambda L}}{\lambda}\left(L + \frac{1}{\lambda} + t_s\right) - k'L < 0 \qquad (8)$$

It may be obtained by transforming Formula (8) that:

$$\frac{k}{k'} < \frac{\lambda^2 L}{\lambda^2 L - 1 - \lambda t_s + e^{-\lambda L}(1 + \lambda L + \lambda t_s)}$$

That is, when the foregoing formula is satisfied, the data write mode of the data write control apparatus 10 is switched to the write-through mode.

After the write-through mode is entered, the quantity of dirty blocks no longer increases. However, because new data is written, data in original dirty blocks are replaced and written to the second memory 12. In this way, the quantity of dirty blocks decreases. When the quantity of dirty blocks decreases to the second preset threshold, the processor 13 switches the data write mode of the data write control apparatus 10 to the write-through mode.

Program execution performance in write-back mode is relatively high. Therefore, the second preset threshold preferably equals the first preset threshold minus 1. In this way, the data write control apparatus 10 may quickly enter the write-back mode. Certainly, in another embodiment, different second preset thresholds may be set according to a specific situation.

Second Embodiment

Figure 3:
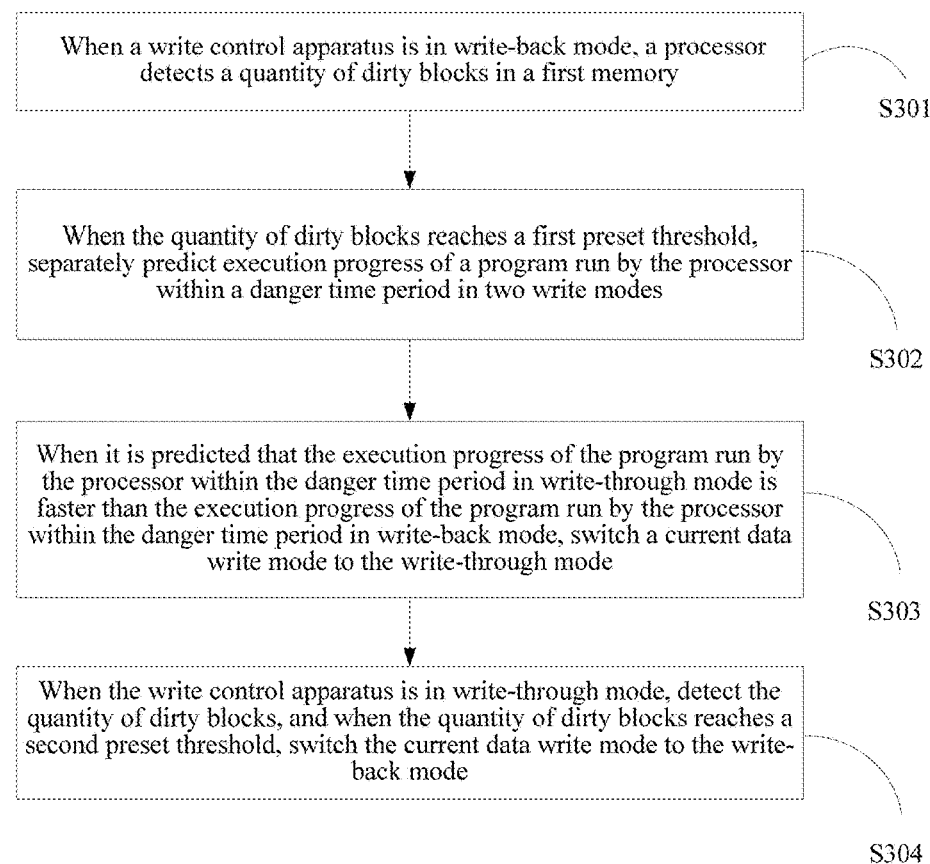
FIG. 3 is a flowchart of a data write method according to a second embodiment.

The second embodiment provides a data write method applied in the data write apparatus provided in the first embodiment. As shown in FIG. 3, FIG. 3 is a flowchart of the data write method.

Step S301: When the write control apparatus is in write-back mode, the processor detects a quantity of dirty blocks in the first memory.

Step S302: When the quantity of dirty blocks reaches a first preset threshold, separately predict execution progress of a program run by the processor within a danger time period in two write modes.

Step S303: When it is predicted that the execution progress of the program run by the processor within the danger time period in write-through mode is faster than the execution progress of the program run by the processor within the danger time period in write-back mode, switch a current data write mode to the write-through mode.

Step S304: When the write control apparatus is in write-through mode, detect the quantity of dirty blocks; and when the quantity of dirty blocks reaches a second preset threshold, switch the current data write mode to the write-back mode.

In this embodiment, the first memory further includes the nonvolatile storage unit. After the data write control apparatus encounters a power failure, data in the volatile storage unit is backed up to the nonvolatile storage unit, and the first preset threshold is a maximum quantity of dirty blocks that can be backed up by the first memory.

In this embodiment, a calculation formula for predicting the execution progress of the program of the write control apparatus when the write-back mode is used is:

$$E(G - R) = k\left(L - \frac{1}{\lambda} - t_s\right) + ke^{-\lambda L}\left(L + \frac{1}{\lambda} - t_s\right)$$

where k is the execution progress of the program run by the processor within a unit time in write-back mode; L is a length of the preset danger time period; if a time when the quantity of dirty blocks reaches the first preset threshold is used as a zero time, $t_s$ is a time when power is supplied to the data write control apparatus within the danger time period; and $1/\lambda$ is an average power supply time of the data write control apparatus that is pre-obtained by means of statistics collection.

A calculation formula for predicting the execution progress of the program of the write control apparatus when the write-through mode is used is:

$$E(G') = k'L$$

where k' is the execution progress of the program run by the processor within a unit time in write-through mode.

In this embodiment, the second preset threshold equals the first preset threshold minus 1.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random access memory (RAM), a magnetic disk, or an optical disc.

The data write apparatus and method provided in the embodiments of the present application are described in detail above. In this specification, specific examples are used to describe the principle and implementation manners of the present application, and the description of the embodiments is only intended to help understand the method and core idea of the present application. In addition, a person of ordinary skill in the art may, based on the idea of the present application, make modifications with respect to the specific implementation manners and the application scope. Therefore, the content of this specification shall not be construed as a limitation to the present application.

What is claimed is:

1. A data write control apparatus, comprising:
a first memory comprising a volatile storage unit;
a second memory comprising a nonvolatile storage unit; and
a processor coupled to the first memory and the second memory, data write modes of the data write control apparatus comprising a write-back mode and a write-through mode, the processor writing received data to the first memory in the write-back mode, the processor writing received data to the first memory and the second memory in the write-through mode, and the processor being configured to:
  detect a quantity of dirty blocks in the first memory when the data write control apparatus is in the write-back mode;
  separately predict execution progress of a program run by the processor within a danger time period in the write-back mode and the write-through mode, the danger time period comprising a time period from a time when the quantity of dirty blocks reaches a first preset threshold time to a time when the quantity of dirty blocks is less than the first preset threshold;
  switch a current data write mode to the write-through mode when it is predicted that the execution progress of the program run by the processor within the danger time period in the write-through mode exceeds the execution progress of the program run by the processor within the danger time period in the write-back mode.

2. The data write control apparatus of claim 1, wherein the first memory further comprises a nonvolatile storage unit, the nonvolatile storage unit being configured to back up data in the volatile storage unit when the data write control apparatus encounters a power failure of an external power supply, the first preset threshold being a maximum quantity of dirty blocks that can be backed up by the first memory.

3. The data write control apparatus of claim 1, wherein a calculation formula for predicting the execution progress of the program of the data write control apparatus when the write-back mode is used is:

$$E(G-R) = k\left(L - \frac{1}{\lambda} - t_s\right) + ke^{-\lambda L}\left(L + \frac{1}{\lambda} - t_s\right),$$

k being the execution progress of the program run by the processor within a unit time in write-back mode, L being a length of the danger time period, $t_s$ being a time of a latest power supply before the quantity of dirty blocks reaches the first preset threshold, $1/\lambda$ being an average power supply time of the data write control apparatus that is pre-obtained by means of statistics collection, a calculation formula for predicting the execution progress of the program of the data write control apparatus when the write-through mode is used is:

$E(G')=k'L$, and k' being the execution progress of the program run by the processor within a unit time in write-through mode.

4. The data write control apparatus of claim 1, wherein the second preset threshold equals the first preset threshold minus one.

5. The data write control apparatus of claim 1, wherein the processor is further configured to:
  detect the quantity of dirty blocks when the data write control apparatus is in the write-through mode; and
  switch the current data write mode to the write-back mode when the quantity of dirty blocks decreases to a second preset threshold.

6. A data write control method applied in a data write control apparatus, the data write control apparatus comprising a first memory, a second memory, and a processor, the first memory comprising a volatile storage unit, the second memory being a nonvolatile storage unit, data write modes of the data write control apparatus comprising a write-back mode and a write-through mode, the processor writing received data to the first memory in the write-back mode, the processor writing received data to the first memory and the second memory in the write-through mode, and the method comprising:
  detecting, by the processor, a quantity of dirty blocks in the first memory when the data write control apparatus is in the write-back mode;
  separately predicting execution progress of a program run by the processor within a danger time period in the write-back mode and the write-through mode, the danger time period comprising a time period from a time when the quantity of dirty blocks reaches a first preset threshold to a time when the quantity of dirty blocks is less than the first preset threshold; and
  switching a current data write mode to the write-through mode when it is predicted that the execution progress of the program run by the processor within the danger time period in write-through mode exceeds the execution progress of the program run by the processor within the danger time period in the write-back mode.

7. The data write control method of claim 6, wherein the first memory further comprises a nonvolatile storage unit, the nonvolatile storage unit being configured to back up data in the volatile storage unit when the data write control apparatus encounters a power failure of an external power supply, and the first preset threshold being a maximum quantity of dirty blocks that can be backed up by the first memory.

8. The data write control method of claim 6, wherein a calculation formula for predicting the execution progress of the program of the data write control apparatus when the write-back mode is used is:

$$E(G-R) = k\left(L - \frac{1}{\lambda} - t_s\right) + ke^{-\lambda L}\left(L + \frac{1}{\lambda} - t_s\right),$$

k being the execution progress of the program run by the processor within a unit time in the write-back mode, L being a length of the danger time period, $t_s$ being a time of a latest power supply before the quantity of dirty blocks reaches the first preset threshold, $1/\lambda$ being an average power supply time of the data write control apparatus that is pre-obtained by means of statistics collection, a calculation formula for predicting the execution progress of the program of the data write control apparatus when the write-through mode is used is:

$$E(G')=k'L, \text{ and}$$

k' being the execution progress of the program run by the processor within a unit time in the write-through mode.

9. The data write control method of claim 6, wherein the second preset threshold equals the first preset threshold minus one.

10. The data write control method of claim 6, further comprising:
   detecting the quantity of dirty blocks when the data write control apparatus is in the write-through mode; and
   switching the current data write mode to the write-back mode when the quantity of dirty blocks decreases to a second preset threshold.

11. A data write control apparatus, comprising:
   a first memory comprising a volatile storage unit;
   a second memory comprising a nonvolatile storage unit; and
   a processor coupled to the first memory and the second memory, data write modes of the data write control apparatus comprising a write-back mode and a write-through mode, the processor writing received data to the first memory in the write-back mode, the processor writing received data to the first memory and the second memory in the write-through mode, and the processor being configured to:
      detect a quantity of dirty blocks in the first memory when the data write control apparatus is in the write-back mode;
      separately predict execution progress of a program run by the processor within a danger time period in the write-back mode and the write-through mode, the danger time period comprising a time period in which the quantity of dirty blocks reaches and is greater than a first preset threshold, a calculation formula for predicting the execution progress of the program of the data write control apparatus when the write-back mode is used is:

$$E(G-R) = k\left(L - \frac{1}{\lambda} - t_s\right) + ke^{-\lambda L}\left(L + \frac{1}{\lambda} - t_s\right),$$

k being the execution progress of the program run by the processor within a unit time in write-back mode, L being a length of the danger time period, $t_s$ being a time of a latest power supply before the quantity of dirty blocks reaches the first preset threshold, $1/\lambda$ being an average power supply time of the data write control apparatus that is pre-obtained by means of statistics collection, a calculation formula for predicting the execution progress of the program of the data write control apparatus when the write-through mode is used is:

$$E(G)=k'L, \text{ and}$$

k' being the execution progress of the program run by the processor within a unit time in write-through mode;
   switch a current data write mode to the write-through mode when it is predicted that the execution progress of the program run by the processor within the danger time period in the write-through mode exceeds the execution progress of the program run by the processor within the danger time period in the write-back mode;
   detect the quantity of dirty blocks when the data write control apparatus is in the write-through mode; and
   switch the current data write mode to the write-back mode when the quantity of dirty blocks decreases to a second preset threshold.

12. The data write control apparatus of claim 11, wherein the volatile storage unit of the first memory comprises static random access memory.

13. The data write control apparatus of claim 11, wherein the nonvolatile storage unit of the second memory comprises phase-change random access memory.

14. The data write control apparatus of claim 11, further comprising an on-chip energy storage capacitor configured to provide a back-up energy supply to the volatile storage unit of the first memory when an external power supply of the volatile storage unit fails.

15. The data write control apparatus of claim 11, wherein the volatile storage unit comprises a plurality of blocks, and each of the blocks comprises a dirty block tag that identifies whether the block comprises dirty data.

16. The data write control apparatus of claim 11, wherein the data write control apparatus comprises a detection apparatus.

17. The data write control apparatus of claim 11, wherein the data write control apparatus comprises a sensor for detecting a health status of a human body.

18. The data write control apparatus of claim 11, wherein the data write control apparatus comprises a wearable device.

19. The data write control apparatus of claim 11, wherein the data write control apparatus comprises a nonvolatile static random access memory.

20. The data write control apparatus of claim 11, further comprising a solar external power supply.

21. The data write control apparatus of claim 11, wherein the first preset threshold is a maximum quantity of dirty blocks that can be backed up by the first memory.

22. The data write control apparatus of claim 11, wherein the second preset threshold equals the first preset threshold minus one.

\* \* \* \* \*